C. LE G. FORTESCUE.
SYSTEM OF DISTRIBUTION.
APPLICATION FILED DEC. 4, 1915.
1,351,033.
Patented Aug. 31, 1920.
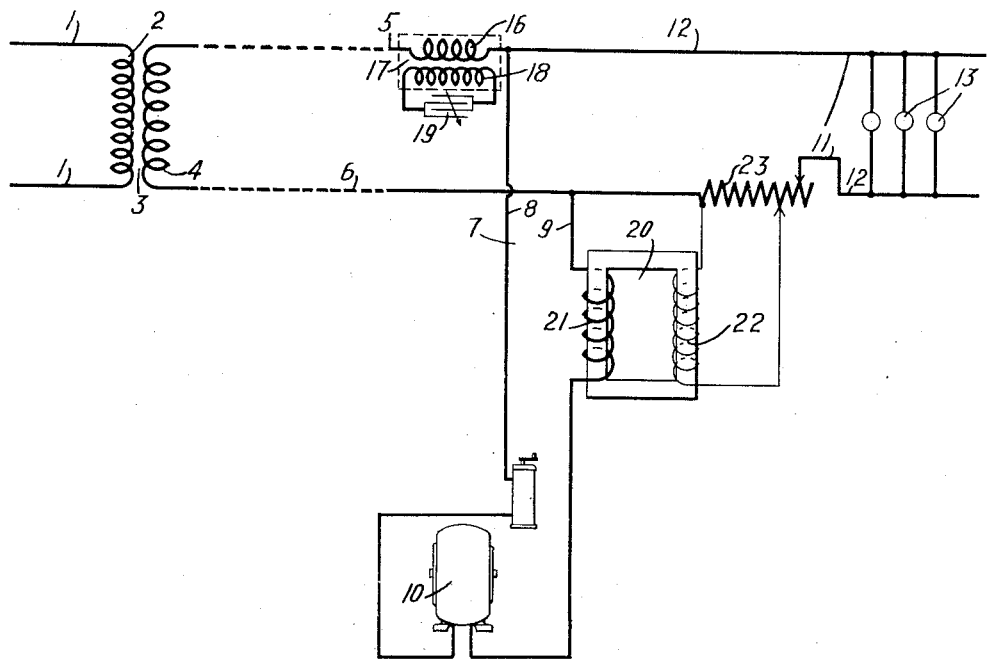
WITNESSES:
Fred. A. Lind.
Geo. W. Hansen.
INVENTOR
Charles LeG. Fortescue
BY
Wesley G. Carr
ATTORNEY

UNITED STATES PATENT OFFICE.

CHARLES LE GEYT FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,351,033.      Specification of Letters Patent.      Patented Aug. 31, 1920.

Application filed December 4, 1915. Serial No. 65,082.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution, of which the following is a specification.

My invention relates to electrical distributing systems and especially to alternating-current systems of distribution which furnish power to loads having different characteristics, such as highly inductive loads in combination with non-inductive loads or varying loads in combination with loads requiring constant voltages or currents.

More particularly, my invention relates to distributing systems of the above indicated character in which means are embodied for automatically regulating the voltages applied to the constant-voltage load devices connected thereto irrespective of the variations in the voltages applied to the varying-voltage load devices.

It is frequently desirable, because of the resulting economies, to supply loads of different characteristics from common distributing mains; for example, to furnish power to induction motors and to incandescent lamps from the same mains and through a single power transformer which is introduced between the transmission or high-voltage line and the distributing or load circuit. Inasmuch as induction motors draw varying load-currents of low power-factors from the distributing circuit, it has been found impractical to operate incandescent lamps for lighting purposes in conjunction therewith because of the poor voltage regulation of the distributing circuit. Induction motor loads and the like may be operated satisfactorily from a circuit having a poor voltage regulation but it is essential to impress constant voltages upon incandescent lamps since the latter are highly susceptible to small voltage variations. Therefore, when an induction motor is connected to the distributing mains, the varying currents supplied thereto effect fluctuations in the voltage furnished the incandenscent lamps whereby the latter will flicker and operate at efficiencies considerably below normal.

For distributing systems that cover large areas, and to avoid the expense of installing pilot circuits, it may be desirable to ascertain, at the power-house or station, the value of the voltage that is impressed upon the incandescent lamps or other constant-voltage load devices. At the same time, it will be economical to provide means for improving the power factor of the distibuting circuit in order that it may operate economically or at substantially unity power-factor, thereby precluding the flow of large wattless currents.

One object of my invention is to provide regulating means which will permit loads of different characteristics to be operated from a common supply circuit without having the amounts of power supplied to the several loads interfere with the regulation of the voltages supplied to such loads as require constant voltages.

Another object of my invention is to provide means whereby the voltage impressed upon the constant-load branch of the distributing circuit may be automatically regulated so that the regulated voltage will be in phase with the line voltage, irrespective of the load variations obtaining in other portions of the distributing circuit.

For a better understanding of the nature and scope of my invention, reference may be had to the following description and the accompanying drawing in which the single figure is a diagrammatic representation of a distributing system embodying one form of my invention.

Referring to the figure, high-tension mains 1 are connected to a primary winding 2 of a transformer 3, the secondary or low-tension winding 4 being connected to distributing mains 5 and 6. It will be presumed that the load devices connected to the mains 5 and 6 are spaced a considerable distance from the transformer 3. A branch circuit 7, comprising mains 8 and 9, delivers power to a variable-voltage and inductive load shown as an induction motor 10. A second branch circuit 11, comprising mains 12, furnishes power to a plurality of constant-voltage load devices 13, shown as incandescent lamps. For the satisfactory operation of the incandescent lamps, it is essential that the voltage impressed thereupon be maintained constant, irrespective of the varying amounts of power or varying currents supplied to the induction motor 10. Since both loads are furnished with power from common mains 5 and 6, means must be provided to compensate for the varying ohmic and reactive voltage drops occasioned in the circuit by reason of the operation of the induction motor 10.

In the main 5, I insert a primary winding 16 of a series transformer 17, a secondary winding 18 thereof being connected in a closed circuit to an adjustable condensive element 19. The condenser 19 is so adjusted that the condensive reactance transferred to the primary winding 16 may be exactly equal to, and opposite in phase with, the inductive drop occasioned by the flow of the secondary or load currents through the entire system. In the main 9 of the auxiliary circuit 7, I insert a second series transformer 20, a primary winding 21 thereof being connected in series relationship with the primary of the induction motor 10, and a secondary winding 22 thereof being connected in shunt relationship to an adjustable non-inductive resistance element 23. The resistance element 23 is inserted in circuit between the varying-voltage load device 10 and the constant-voltage load devices 13. Since the windings 21 and 22 are inductively related, the voltage induced in the secondary winding 22 will, at all times, be proportional to the current flowing in the winding 21. Moreover, the winding 22 is so connected across the non-inductive resistance element 23 that the voltage drop resulting from the secondary current flow through said element will compensate for the ohmic voltage drop occasioned by the flow of the load currents through all parts of the circuit except the circuit 11. It will be understood, therefore, that the compensating voltage introduced in the resistance element 23 may be equal and opposite in phase to the ohmic voltage-drop in the circuit exclusive of the branch circuit 11.

From the above description, it will be noted that the voltage impressed upon the lamps 13 will be automatically regulated to a constant value, irrespective of the load conditions obtaining in the branch circuit 7. Again, by properly adjusting the condensive reactance of the condenser element 19 and the ohmic voltage-drop occasioned by the induced currents flowing through the non-inductive element 23, the voltage impressed upon the lamps 13 may be maintained equal to, and in phase relationship with, the voltage across the terminals of the secondary winding 4 of the transformer 3. In this manner, the voltage obtaining in the constant-voltage load branch circuit may be readily ascertained by measuring the voltage at the power house or station.

While I have shown a preferred form of my invention, it will be understood that many modifications and various adjustments may be effected for obtaining different electrical conditions on different portions of the circuit without departing from the spirit and scope of the appended claims.

I claim as my invention:

1. The method of maintaining the voltage impressed upon one branch circuit of a composite load circuit constant and in phase with the voltage impressed on the load circuit which consists in impressing upon said branch circuit an electromotive force that is in phase with the current flowing in the mains of the composite load circuit and substantially in proportion to the current delivered to a second branch circuit, and impressing an electromotive force on the load circuit that is opposite in phase to the reactive voltage drop obtaining in the load circuit.

2. The method of maintaining the voltage impressed upon one branch circuit of a composite load circuit constant, equal to, and in phase with, the voltage impressed across the power mains of the latter circuit which consists in impressing upon said branch circuit an electromotive force that is in phase with the current flowing in said power mains equal to the ohmic drop caused by the current of a second branch circuit flowing in the portion of the circuit extending between the power supply point and the said branch circuit, and proportional to the said current and impressing an electromotive force on the load circuit that is opposite in phase and equal to the reactive drop obtaining in the load circuit.

3. The method of maintaining the voltage impressed upon one branch circuit of a composite load circuit constant and in phase with the voltage impressed upon the power mains, which consists in impressing upon said branch circuit a resultant electromotive force that comprises two component electromotive forces one of which is in phase with the current flowing in the power mains and substantially in proportion to the varying current delivered to a second branch circuit of variable load and the other of which is opposite in phase to the reactive drop obtaining in the load circuit.

4. In a system of electrical distribution, the combination with a main circuit, a branch circuit requiring varying amounts of power connected thereto, and a second branch circuit requiring a constant electromotive force, of means inserted in the main circuit for compensating for the reactive drop therein, and means influenced by the varying currents flowing in said first branch circuit for impressing upon said second branch circuit an electromotive force to automatically compensate for the ohmic drop in the main circuit caused by the current of the first branch circuit.

5. In a system of electrical distribution, the combination with a main circuit, of a branch circuit requiring varying amounts of power for inductive loads connected thereto, and a second branch circuit requiring a constant electromotive force, of transformer means interconnecting said first and second branch circuits, whereby an electromotive force is impressed upon said second branch circuit to compensate for the ohmic drop in the main circuit, caused by the current of the first branch circuit, and means serving to impress upon said second branch circuit an electromotive force to compensate for the reactive drop in the circuits.

6. In a system of electrical distribution, the combination with a main circuit, a branch circuit requiring varying amounts of power for inductive loads connected thereto, and a second branch circuit requiring a constant electromotive force, of a coil in series with said first-named branch circuit, another coil inductively interlinked with said first coil whereby an electromotive force is impressed upon said second branch circuit to compensate for the ohmic drop in the main circuit caused by the current of the first branch circuit, and means serving to impress upon said second branch circuit an electromotive force to compensate for the reactive drop in the circuits.

7. In a system of electrical distribution, the combination with a main circuit, a branch circuit requiring varying amounts of power for inductive loads connected thereto, and a second branch circuit requiring a constant electromotive force, of a resistance element in series with said second branch circuit, a coil in series with said first-named branch circuit, another coil inductively interlinked with said first coil and supplying current to said resistance element whereby an electromotive force is impressed upon said second branch circuit to compensate for the ohmic drop in the main circuit caused by the current of the first branch circuit, and means serving to impress upon said second branch circuit an electromotive force to compensate for the reactive drop in the circuits.

In testimony whereof, I have hereunto subscribed my name this 30th day of Nov. 1915.

CHARLES LE GEYT FORTESCUE.